United States Patent Office.

EDWARD HUBBARD RUSSELL, OF PARK CITY, UTAH TERRITORY.

PROCESS OF PURIFYING HYPOSULPHITE SOLUTIONS USED IN LEACHING ORES.

SPECIFICATION forming part of Letters Patent No. 295,886, dated March 25, 1884.

Application filed August 28, 1882. Renewed February 27, 1884. (No specimens.)

*To all whom it may concern:*

Be it known that I, EDWARD H. RUSSELL, of Park City, in the county of Summit and Territory of Utah, have invented certain Improvements in Process of Purifying Hyposulphite Solutions used in Leaching Ores, of which the following is a specification.

In the ordinary process of leaching with a hyposulphite solution, hyposulphite of soda being generally used, a tub of a capacity of one to ten tons is filled two-thirds full of chloridized ore. Water is then turned on and allowed to filter through. This dissolves and removes the soluble salts formed in the roasting. After these salts are washed out a solution containing a hyposulphite of an alkali or alkaline earth is turned on and allowed to filter through the ore. This dissolves and carries with it the chloride of silver contained in the ore. After the solution has passed through the ore it is conducted into precipitating-tubs, and the metals contained in it are precipitated as sulphides. The solution is then ready to be used again. Unfortunately, however, after the solution has been used for some time it accumulates impurities which interfere with the action of the hyposulphite solution on the metal in the ore. Some of these impurities are harmless, but others, particularly the hydrates of sodium, potassium, calcium, and magnesium, prevent a certain amount of silver from being dissolved out of the ore by the hyposulphite solution; consequently this portion of the silver remains with the ore and is thrown away with the tailings. The hydrates—as, for instance, those of sodium or calcium—interfere with the action of the hyposulphite solution by converting a certain portion of the chloride of silver, which is soluble in the hyposulphite solution, into a hydrate or oxide which is insoluble in the solution. If the hyposulphite solution contains a small amount—even one-tenth of one per cent.—of sodium or calcium hydrate, only ninety per cent. of the silver can be extracted by the solution in leaching.

The object of this invention is to neutralize these impurities; and it consists in adding to the hyposulphite solution an acid, of which the most suitable is sulphuric acid.

In practice I use only a very small quantity of acid—two to fifteen pounds in a thousand or more gallons of the solution—and I repeat this from time to time accordingly to the rate at which impurities accumulate in the solution. As the hyposulphite solution would be decomposed by sulphuric acid, care must be taken not to add more than enough acid to neutralize the alkaline impurities. The hyposulphite solution may, however, if weak, be left slightly acid. Instead of sulphuric acid, sulphurous acid, either in solution or as a gas, may be used.

Having thus described my invention, what I claim is—

1. In the art of leaching ores with hyposulphite solutions wherein the solutions are reused after the precipitation of the precious metals therefrom, the process of neutralizing the alkaline impurities, which consists in adding an acid to the solution substantially in the proportion and manner described.

2. In the art of leaching ores with hyposulphite solutions, the process of restoring the solutions after they have been used, consisting in introducing into the solutions sulphuric acid to neutralize the impurities therein, substantially as described.

EDWARD HUBBARD RUSSELL.

Witnesses:
JOHN KEETLEY,
F. W. HAYT.